May 24, 1966  A. C. POLIZZI  3,252,403
COFFEE FILTER
Filed Oct. 19, 1962
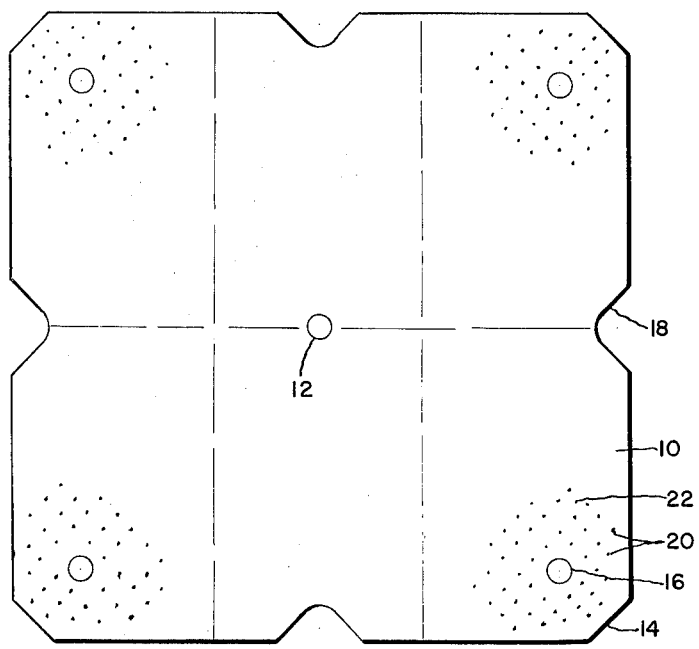
INVENTOR.
ANTHONY C POLIZZI
BY
ATTORNEY 3,252,403
COFFEE FILTER
Anthony Charles Polizzi, 161 Wendhurst St.,
Rochester, N.Y.
Filed Oct. 19, 1962, Ser. No. 231,775
4 Claims. (Cl. 99—312)

This invention relates to coffee filters, and more particularly to a filter adapted for application to the cup of a coffee percolator.

In my Patent #2,859,684, issued November 11, 1958, there is disclosed a coffee filtering retainer comprising a relatively square sheet of porous filter paper having a central aperture and corner apertures, the sheet being adapted to be placed within the cup of a percolator coffee pot, by threading the central aperture over the percolator tube. After introducing a desired quantity of ground coffee into the cup and upon the filter paper, the corner apertures, and corners of the sheet are threaded over the percolator tube to enclose the coffee. Thereafter the coffee is brewed in a conventional manner the boiling water percolating down through the wrapped ground coffee to provide a clear brew, free of grounds, dregs and the like. When the coffee is spent, the entire sheet with the spent coffee grounds wrapped therein is dumped as a package, by inversion of the cup and percolator tube, over for example a trash or garbage receptacle, the cup remaining clean and free of grounds, and ready for a subsequent brew.

While the aforesaid filter disclosed in my patent is completely effective in the percolation of a coffee brew which is clear of dregs, the brewing of coffee may be effected in a shorter time by modifying the filter sheet in that in addition to the porosity of the filter sheet, a series of fine apertures or perforations may be placed in the corner regions of the sheet, whereby to admit percolated water into the pack more readily through the upper side of the filter sheet wrap of the coffee in the percolator cup. The small apertures, being in the top side of the wrap do not permit any substantial escape of grounds or minute particles of coffee such as would prevent the preparation of a clear brew, since the central area of the filter paper is imperforate, that is merely porous, and acts as an effective filter. At the same time the presence of the small perforations or pin holes in the corner portions of the sheet permit the more ready flow of percolated fluid through the pack, to effect a saving of time in the completion of effecting a brew. Such ready flow through the package avoids considerable bypass of percolated water around the pack, and through the side wall perforations in the percolated cup, or over the upper rim thereof.

The above and other features of my invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings there is shown a plan view of a filter sheet in accordance with the invention.

Referring to the drawings there will be seen a sheet of filter paper 10, which may be approximately nine and one half inches square. The filter paper is provided with a central aperture 12 of a size to effect a close fit about the percolator tube of a coffee pot. Such aperture may be about 5/16 inch in diameter, and in practice may be somewhat undersize, so as to be slightly ruptured upon threading upon the percolator tube, and so that the aperture perimeter may snugly embrace the tube to prevent bypass around the tube.

The corners of such sheet may be rounded or cut off as indicated at 14, and in each corner is an aperture 16 adapted to fit over the percolator tube. Such apertures may be approximately 5/16 of an inch in diameter. Centrally along the side edges, a wide V notch 18 may be provided as shown to facilitate the folding of the four corners over the ground coffee, when the filter paper is placed within the percolator cup.

In order to facilitate the flow of percolating fluid into and through the wrapped ground coffee as contained in the cup within the sheet of filter paper, the corner areas may have minute perforations or pin holes spaced 1/8 to 1/4 inch apart as indicated at 20, in an area as bounded for example by the dotted line 22. Thus percolating fluid may more freely enter the wrapped ground coffee through such apertures. Since all of the perforations 20 are disposed in the top side of the wrap, no dregs can gravitate therethrough, and the central area of the filter paper remains effective to provide a clear brew.

In practice a single sheet of filter paper is employed with each brew, and disposed of with the spent coffee grounds wrapped within.

In practice the filter paper may be of the type disclosed in patents to Osborne such as 2,626,214, 2,414,833, 2,477,000 and 2,336,367, wherein is disclosed tea bag filter paper having a suitable porosity, and a high wet strength. In order to avoid the necessity of reinforcing the central area of the filter paper, as disclosed in my Patent #2,859,684, a paper of suitable weight, thickness and wet strength may be employed, of the type referred to in the aforesaid patents.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A filter sheet for use in a coffee percolator cup to wrap around ground coffee contained therein, said sheet being substantially square and having a central area adapted to lie on the bottom of a percolator cup and a central aperture adapted to be threaded over a percolator tube extending up through the center of the cup, said central area being otherwise imperforate except for the filtering characteristics of the sheet, and an aperture in each of the corner areas, all of said apertures being adapted to be closely threaded over the percolator tube of a coffee percolator cup, said sheet having a group of relatively small perforations in each of the corner areas only to permit freer flow of water therethrough.

2. A filter sheet as set forth in claim 1 having the corners removed to eliminate unnecessary impediment to the entry of water therethrough.

3. A filter sheet as set forth in claim 1 having the sides thereof notched centrally thereof to facilitate folding of the corners over one another in wrapping ground coffee contained on a filter sheet having its central area disposed in a coffee percolator cup.

4. A filter sheet as set forth in claim 1 having the corners removed and the side edges centrally notched.

References Cited by the Examiner

UNITED STATES PATENTS

| | | | |
|---|---|---|---|
| 1,352,232 | 9/1920 | Weightman et al. | 53—207 X |
| 1,481,757 | 1/1924 | Stokes | 53—207 X |
| 2,660,107 | 11/1953 | Cappello | 99—312 |
| 2,859,684 | 11/1958 | Polizzi | 210—496 X |
| 3,083,100 | 3/1963 | Baran | 99—312 X |
| 3,225,680 | 12/1965 | Cirrincione | 210—282 X |

REUBEN FRIEDMAN, *Primary Examiner.*

HERBERT L. MARTIN, *Examiner.*

S. ZAHHARNA, *Assistant Examiner.*